(12) United States Patent
Jo et al.

(10) Patent No.: US 12,102,283 B2
(45) Date of Patent: Oct. 1, 2024

(54) DOCKING DEVICE AND MOBILE ROBOT SYSTEM

(71) Applicant: LG ELECTRONICS INC., Seoul (KR)

(72) Inventors: Wonchul Jo, Seoul (KR); Ilsoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 17/625,222

(22) PCT Filed: Jul. 7, 2020

(86) PCT No.: PCT/KR2020/008835
§ 371 (c)(1),
(2) Date: Jan. 6, 2022

(87) PCT Pub. No.: WO2021/006590
PCT Pub. Date: Jan. 14, 2021

(65) Prior Publication Data
US 2022/0240743 A1     Aug. 4, 2022

(30) Foreign Application Priority Data
Jul. 8, 2019   (KR) .................. 10-2019-0082170

(51) Int. Cl.
*A47L 9/28*     (2006.01)
*G10L 15/22*    (2006.01)

(52) U.S. Cl.
CPC ........... *A47L 9/2873* (2013.01); *A47L 9/2857* (2013.01); *A47L 9/2894* (2013.01); *G10L 15/22* (2013.01); *A47L 2201/022* (2013.01); *A47L 2201/04* (2013.01); *G10L 2015/223* (2013.01)

(58) Field of Classification Search
CPC .... A47L 9/2873; A47L 9/2857; A47L 9/2894; A47L 2201/022; A47L 2201/04; G10L 15/22; G10L 2015/223; G10L 15/30
See application file for complete search history.

(56) References Cited

U.S. PATENT DOCUMENTS

| 9,436,186 B2 * | 9/2016 | Oh | H04L 12/2803 |
| 2014/0156075 A1 * | 6/2014 | Yang | A47L 11/4002 700/257 |

(Continued)

FOREIGN PATENT DOCUMENTS

| CA | 2 970 468 A1 | 6/2016 |
| JP | 2017-536938 A | 12/2017 |

(Continued)

*Primary Examiner* — Jason Holloway
*Assistant Examiner* — Benjamin J Brosh
(74) *Attorney, Agent, or Firm* — Birch, Stewart, Kolasch & Birch, LLP (57) ABSTRACT

The present disclosure discloses a docking device including a charging terminal, a power supply unit for supplying power to the charging terminal, a communication module for exchanging data with a mobile robot, a voice recognition module for collecting a voice and extracting a voice command from the collected voice, and a charging-station controller for controlling the communication module to transmit the voice command extracted from the voice recognition module to the mobile robot.

14 Claims, 7 Drawing Sheets

(56) References Cited

U.S. PATENT DOCUMENTS

| | | | | |
|---|---|---|---|---|
| 2015/0375395 | A1* | 12/2015 | Kwon | A47L 9/2873 |
| | | | | 901/30 |
| 2017/0361468 | A1 | 12/2017 | Cheuvront et al. | |
| 2018/0338661 | A1* | 11/2018 | Shin | A47L 11/4061 |
| 2018/0358005 | A1* | 12/2018 | Tomar | G06F 40/30 |
| 2019/0155297 | A1 | 5/2019 | Liu et al. | |
| 2020/0227040 | A1* | 7/2020 | Duncan | G06F 3/167 |

FOREIGN PATENT DOCUMENTS

| | | |
|---|---|---|
| KR | 10-2014-0071740 A | 6/2014 |
| KR | 10-2014-0128021 A | 11/2014 |
| KR | 10-2016-0008780 A | 1/2016 |

\* cited by examiner

DOCKING DEVICE AND MOBILE ROBOT SYSTEM

CROSS-REFERENCES TO RELATED APPLICATIONS

This application is the National Stage filing under 35 U.S.C. 371 of International Application No. PCT/KR2020/008835, filed on Jul. 7, 2020, which claims the benefit of earlier filing date and right of priority to Korean Application No. 10-2019-0082170 filed on Jul. 8, 2019. The contents of all the above-referenced applications are hereby incorporated by reference herein in their entirety.

TECHNICAL FIELD

The present disclosure relates to a docking device and a mobile robot system, and more particularly, to a docking device and a mobile robot system capable of collecting a voice of a user at the docking device.

BACKGROUND

Robots have been developed for industrial use and have been in charge of part of factory automation. In recent years, as an application field of a robot has been further expanded, a medical robot, an aerospace robot, or so on has been developed, and a home robot that is used in general home is also being made. Among these robots, a robot capable of driving or traveling by itself is called a mobile robot. A representative example of a mobile robot used at home is a robot cleaner.

Various techniques for detecting or sensing a user and an environment at a periphery of a robot cleaner through various sensors provided in the robot cleaner are known. In addition, techniques are known in which a robot cleaner learns a driving area or a traveling area and generates a map by itself and grasps a current location on the map. A robot cleaner of cleaning the driving area while driving or traveling the driving area in a preset manner is known.

In order to determine or judges a distance between a robot cleaner and an obstacle or a wall and generate a map on a periphery of the robot cleaner, the conventional robot cleaner uses an optical sensor that easily determines the distance, easily grasps the terrain feature, and easily grasps the image of the obstacle.

In addition, in the prior art (Korean Patent Laid-open Publication No. 10-2015-0053863), for improving convenience of control of a mobile robot, voice recognition speaker and microphone are installed on the mobile robot. In the prior art, a voice command for controlling the mobile robot is extracted, and the mobile robot is controlled to correspond to the extracted voice command.

However, in the prior art, since a terminal provided in a body of a robot cleaner or a robot cleaner itself performs voice recognition, voice recognition performance may be deteriorated due to a motor noise of the body of the robot cleaner.

In addition, in the prior art, voice recognition performance may be deteriorated when the robot cleaner performs a lot of work because the voice recognition performance is highly dependent on an operation situation of the robot cleaner.

SUMMARY

Technical Problem

The present disclosure is for providing a docking device and a mobile robot system capable of performing accurate voice recognition regardless of a motor noise during cleaning by a robot cleaner.

The present disclosure is also for providing a docking device and a mobile robot system capable of performing voice recognition and extracting a voice command without a control burden on a robot cleaner, even when the robot cleaner performs other works.

Technical Solution

In order to solve the technical problem, a docking device according to an embodiment the present disclosure includes a charging terminal, a power supply unit for supplying power to the charging terminal, a communication module for exchanging data with a mobile robot, a voice recognition module for collecting a voice and extracting a voice command from the collected voice, and a charging-station controller for controlling the communication module to transmit the voice command extracted from the voice recognition module to the mobile robot.

The voice recognition module may include a voice input unit for collecting the voice, a voice recognition unit for extracting a text from the collected voice, and a command recognition unit for extracting the voice command for the mobile robot from the extracted text.

The voice recognition unit may include a microphone.

The microphone may include two microphones spaced apart from each other.

The docking device according to the embodiment may further include a base and a charging-station body. The charging terminal may be disposed at the base. The charging-station body may be connected to an end of the base, accommodate the power supply unit, and have a voice inlet hole through which the voice flows. The microphone may be accommodated in the charging-station body.

The charging-station body may include an upper surface disposed higher than the base and a side surface connecting the upper surface and the base. The voice inlet hole may be formed at the upper surface.

In addition, the docking device according to the embodiment may further include an adhesive member disposed to surround the voice inlet hole and adhering the upper surface and the microphone.

The microphone is a disposed lower than the upper surface.

The charging-stand controller may classify the voice command extracted from the voice recognition module into an executable voice command being executable by the mobile robot and an inexecutable voice command being not executable by the mobile robot. The charging-stand controller may control the communication module to transmit the inexecutable voice command to at least one of a server and an home appliance other than the mobile robot.

The charging-stand controller may control the communication module to transmit the executable voice command to the mobile robot.

When the voice command extracted from the voice recognition module is a voice command executable by the mobile robot and the home appliance other than the mobile robot, the charging-stand controller may control the communication module to transmit the voice command only to the mobile robot.

In addition, the docking device according to the embodiment may further include a docking detection unit for detecting a docking of the mobile robot, and a guide signal transmitter for transmitting a guide signal for guiding the mobile robot.

A mobile robot system according to an embodiment of the present disclosure includes a mobile robot and a docking device. The mobile robot includes a main body and a driving unit for moving the main body. The docking device charges a battery of the mobile robot, extracts a voice command from a voice, and is connected to the mobile robot by a wireless communication method. The docking device transmits the extracted voice command to the mobile robot, and the mobile robot operates according to the voice command transmitted from the docking device.

In this instance, the docking device may include a charging terminal, a power supply unit for supplying power to the charging terminal, a communication module for exchanging data with a mobile robot, a voice recognition module for collecting a voice and extracting a voice command from the collected voice, and a charging-station controller for controlling the communication module to transmit the voice command extracted from the voice recognition module to the mobile robot.

Wherein the mobile robot may further include an output unit of outputting information. When the mobile robot cannot operate according to the voice command transmitted from the docking device, the mobile robot system outputs information that the voice command is inexecutable through the output unit.

Advantageous Effects

According to an embodiment of this disclosure, there are one or more of the following effects.

First, according to the present disclosure, a voice recognition module is installed on a docking device, thereby solving a problem that accurate voice recognition is difficult due to a motor noise during cleaning by a robot cleaner. Accordingly, according to the present disclosure, accurate voice recognition can be achieved during cleaning by a robot cleaner.

Secondly, according to the present disclosure, when a user does not know an exact location of a robot cleaner during cleaning, the user can execute a voice command for controlling the robot cleaner near a docking device. Accordingly, voice recognition can be achieved even when the user does not know the location of the robot cleaner.

Third, the conventional robot cleaner may consume a lot of resources by operations, such as, object recognition of an obstacle, obstacle mapping, evasion determination, or so on in order to perform cleaning. According to the present disclosure, a processor related to voice-command extraction is separately installed on a docking device, and thus, an operation of extracting a voice command is separately performed and a computational burden of a robot cleaner can be reduced.

The effects of the present disclosure are not limited to the above effects, and other effects that are not mentioned in the above will be clearly understood by those skilled in the art from claims.

DETAILED DESCRIPTION

The present disclosure will be clarified with reference to embodiments described below in detail together with the accompanying drawings. However, the present disclosure is not limited to the embodiments disclosed below, but may be implemented in various different forms. These embodiments are just provided to make the present disclosure complete, and to fully informs the present disclosure to a person having ordinary skill in the art to which the present disclosure pertains. A scope of the present disclosure is only defined by claims. The same reference numerals refer to the same components, units, members, portions, or elements throughout the specification.

The spatially relative terms, such as, "below", "beneath", "lower", "above" and "upper" and the like may be used to easily describe a correlation of components with other components. The spatially relative terms may mean directions shown in the drawings, and also, may mean directions of components different to the direction shown in the drawings in consideration of directions at the time of use or operation. For example, when components shown in the drawing are inverted, a component described as "below" or "beneath" of another element may be placed "above" of another element. Thus, the exemplary express of a component is "below" another component may include both a case the component is located at a lower position of the another component and a case the component is located at an upper position of the another component. Components may also be oriented in a different direction, and thus, the spatially relative terms may be interpreted according to orientation.

A term used herein is for describing an embodiment and is not intended to limit the present disclosure. In this specification, a singular form may include a plural form unless a context clearly dictates otherwise. Also, a term of "comprise", "comprising", or "include", "including" in the specification does not exclude a presence or an addition of one or more of other elements, steps, and/or operations, other than the mentioned component, step, and/or operation Unless defined otherwise, all terms (including technical and scientific terms) used herein may be used in a sense commonly understood by a person having ordinary skill in the art to which the present disclosure pertains. In addition, terms defined in the commonly used dictionary are not ideally or excessively interpreted unless explicitly defined otherwise.

A mobile robot 100 according to the present disclosure may include a robot capable of moving itself using wheels or the like, and may include a home helper robot, a robot cleaner, or so on.

Hereinafter, a robot cleaner according to the present disclosure will be described in more detail with reference to the drawings.

Embodiments disclosed herein will be described in detail with reference to the accompanying drawings, but technical terms used herein are merely used to describe specific embodiments and are not intended to limit the spirit of technology disclosed herein.

Figure 1:
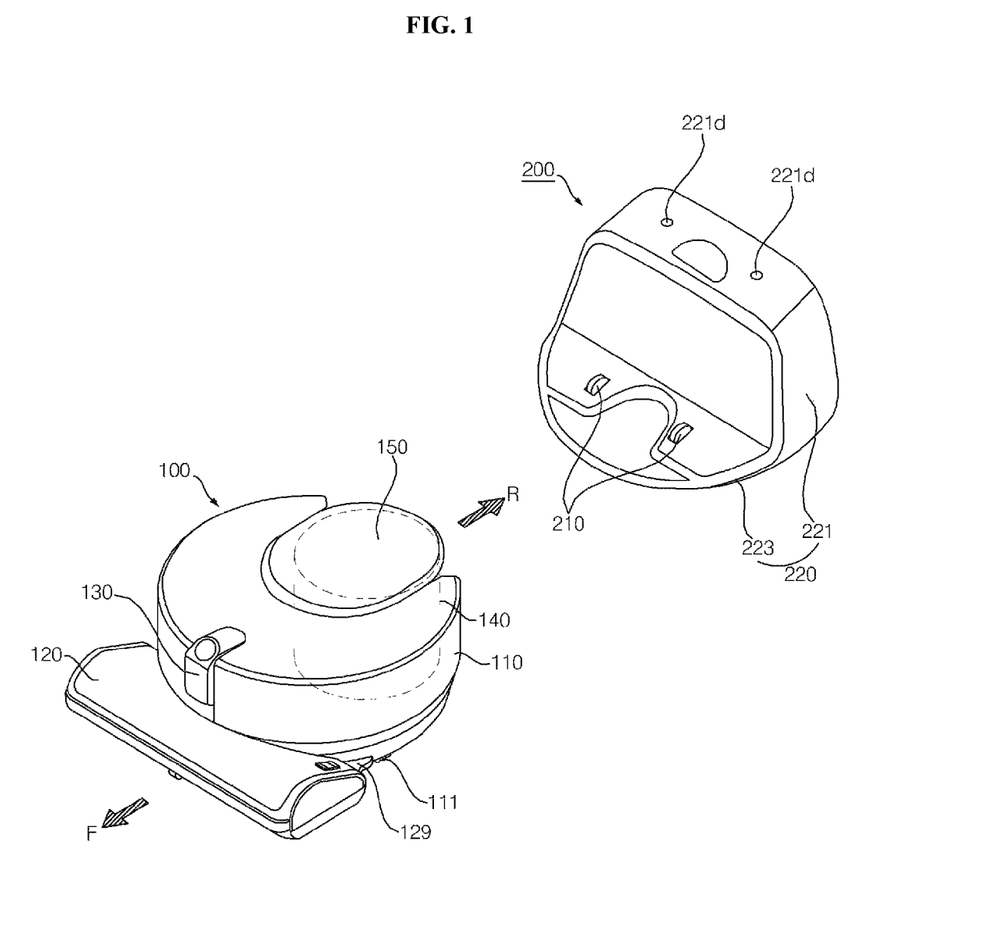
FIG. 1 is a perspective view showing an example of a mobile robot according to the present disclosure.
Figure 2:
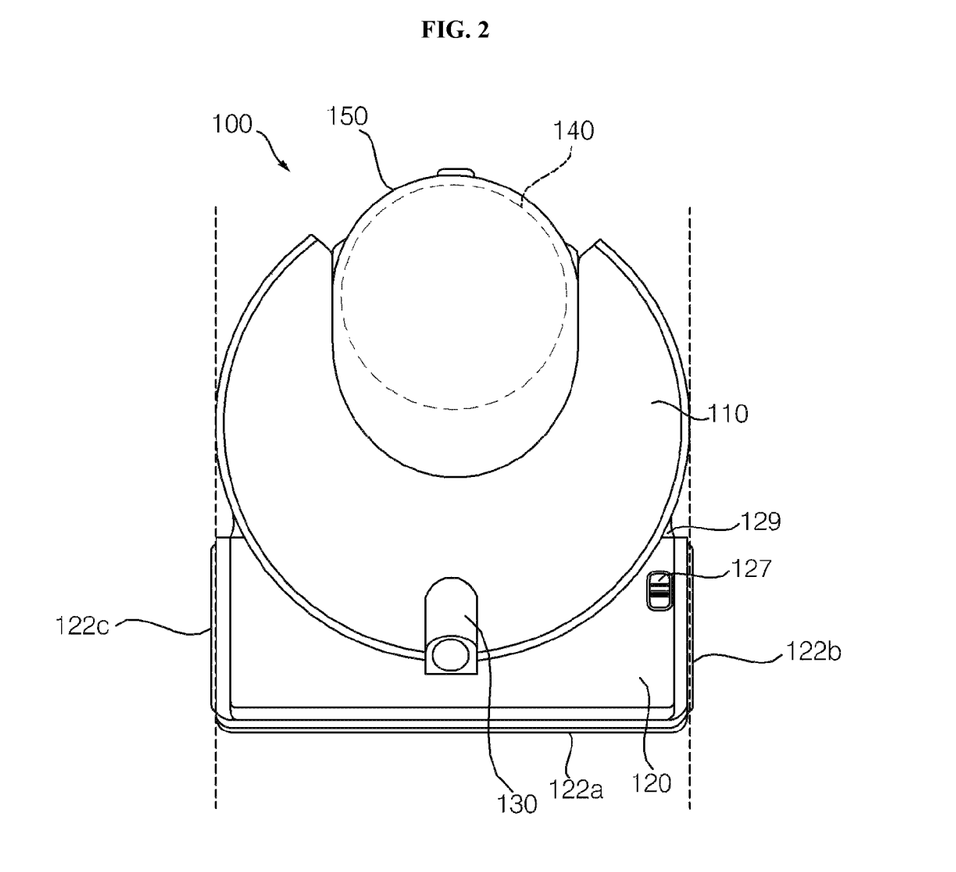
FIG. 2 is a plan view of the robot cleaner shown in FIG. 1.

FIG. 1 is a perspective view showing an example of a mobile robot according to the present disclosure. FIG. 2 is a plan view of a robot cleaner 100 shown in FIG. 1, and FIG. 3 is a side view of the robot cleaner 100 shown in FIG. 1.

In the present specification, a mobile robot, a robot cleaner, and a cleaner performing autonomous driving may be used in the same meaning. In addition, in the present specification, a plurality of cleaners may include at least a part of components described below with reference to FIG. 1 to FIG. 3 or shown in FIG. 1 to FIG. 3.

Figure 3:
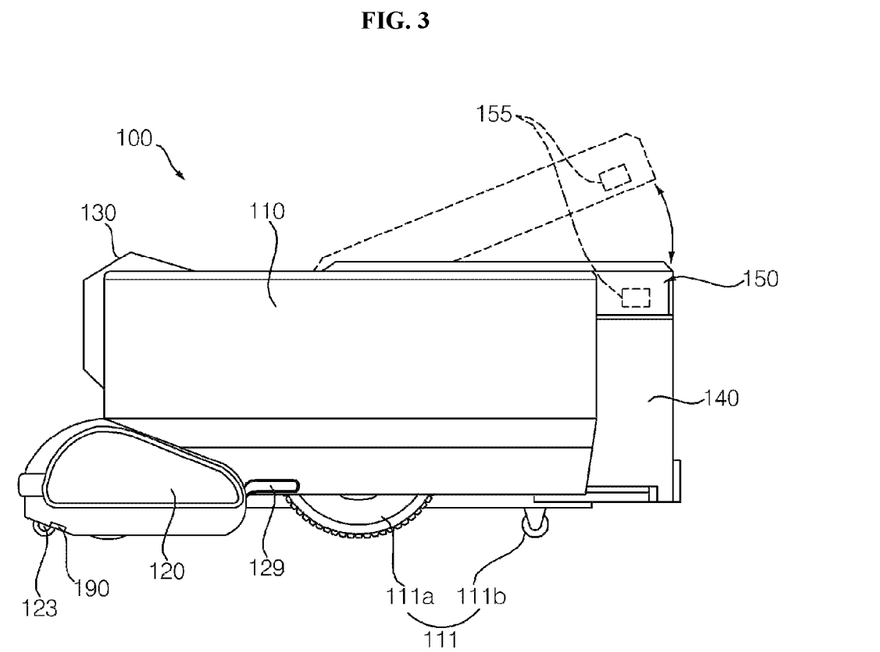
FIG. 3 is a side view of the robot cleaner shown in FIG. 1.

Referring to FIG. 1 to FIG. 3, a mobile robot system may include a mobile robot and a docking device where the mobile robot is docked. The docking device may transmit an extracted voice command to the mobile robot, and the mobile robot operates according to the voice command transmitted from the docking device.

Hereinafter, a robot cleaner will be described as an example of a mobile robot.

A robot cleaner 100 performs a function of cleaning a floor while driving a certain area by itself. In this instance, the cleaning of the floor may include inhaling of a dust (including a foreign material) on the floor or mopping the floor.

The robot cleaner 100 may include a cleaner main body 110, a cleaning unit 120, a sensing unit 130, and a dust container 140. The cleaner main body 110 is provided with a controller 1800 for controlling the robot cleaner 100 and various elements or components may be built-in or mounted on the cleaner main body 110. In addition, the robot cleaner 100 may include a wheel unit 111 for driving or traveling the robot cleaner 100. By the wheel unit 111, the robot cleaner 100 may move in forward, back, left, and right directions, or may rotate.

Referring to FIG. 3, the wheel unit 111 may include a main wheel 111a and a sub-wheel 111b.

Main wheels 111a may be provided at both sides of the cleaner main body 110, respectively, and may be configured to be rotatable in one direction or in the other direction according to a control signal of the controller. The main wheels 111a may be configured to be driven independently of each other. For example, the main wheels 111a may be driven by different motors, respectively. Alternatively, the main wheels 111a may be driven by a plurality of different axes, respectively, provided in one motor.

The sub-wheel 111b may support the cleaner main body 110 together with the main wheels 111a, and may be configured to assist driving of the robot cleaner 100 by the main wheels 111a. A sub-wheel 111b may also be provided at the cleaning unit 120, which will be described later.

The controller may control the driving of the wheel unit 111, and thus, may make the robot cleaner 100 autonomously drive the floor.

Meanwhile, a battery (not shown) for supplying power to the robot cleaner 100 is mounted on the cleaner main body 110. The battery may be rechargeable and may be detachably attached to a bottom surface portion of the cleaner main body 110.

In FIG. 1, the cleaning unit 120 is disposed in a form of protruding from one side of the cleaner main body 110 to suck air containing a dust. The one side may be a side in which the cleaner main body 110 travels in a forward direction F, that is, a front side of the cleaner main body 110.

In the drawings, it is shown that the cleaning unit 120 has a shape protruding toward a front side and both right and left sides at one side of the cleaner main body 110. Specifically, a front end portion of the cleaning unit 120 is disposed at a position spaced from one side of the cleaner main body 110 to the front direction, and both right and left end portions of the cleaning unit 120 are spaced from one side of the cleaner main body 110 to the left and right directions, respectively.

The cleaner main body 110 may have a circular shape and both sides of a rear end portion of the cleaning unit 120 may protrude from the cleaner main body 110 to the left and right directions, respectively. Accordingly, an empty space, that is, a gap may be formed between the cleaner main body 110 and the cleaning unit 120. The empty space is a space between the left and right end portions of the cleaner main body 110 and the left and right end portions of the cleaning unit 120, and has a shape recessed toward an inside of the robot cleaner 100.

When an obstacle is caught in the empty space, the robot cleaner 100 may be caught by the obstacle and thus may not move due to the obstacle. To prevent this, a cover member 129 may be disposed to cover at least a portion of the empty space.

The cover member 129 may be provided at the cleaner main body 110 or the cleaning unit 120. In the embodiment, it is shown that cover members 129 are protruded at both sides of a rear end portion of the cleaning unit 120 to be disposed to cover an outer circumferential surface of the cleaner main body 110.

The cover member 129 is disposed to fill at least a portion of the empty space, that is, the empty space between the cleaner main body 110 and the cleaning unit 120. Therefore, the obstacle can be prevented from being caught in the empty space of the robot cleaner 100, or the robot cleaner 100 may have a structure being able to be easily separated from the obstacle even if the obstacle is caught in the empty space.

The cover member 129 protruding from the cleaning unit 120 may be supported by an outer circumferential surface of the cleaner main body 110. When the cover member 129 protrudes from the cleaner main body 110, the cover member 129 may be supported by a rear portion of the cleaning unit 120. According to the above structure, when the cleaning unit 120 hits an obstacle and receives an impact, a part of the impact is transmitted to the cleaner main body 110 and thus the impact can be distributed.

The cleaning unit 120 may be detachably coupled to the cleaner main body 110. When the cleaning unit 120 is separated from the cleaner main body 110, a mop module (not shown) may be detachably coupled to the cleaner main body 110 by replacing the separated cleaning unit 120. Accordingly, the user may mount the cleaning unit 120 on the cleaner main body 110 when the user wants to remove a dust on a floor, and may mount the mop module on the cleaner main body 110 when the user wants to wipe the floor.

When the cleaning unit 120 is mounted on the cleaner main body 110, the mounting may be guided by the above-described cover member 129. That is, since the cover member 129 is disposed to cover the outer circumferential surface of the cleaner main body 110, a relative position of the cleaning unit 120 with respect to the cleaner main body 110 may be determined.

The cleaning unit 120 may be provided with a caster 123. The caster 123 may assist driving or traveling of the robot cleaner 100 and may be further support the robot cleaner 100. A sensing unit 130 may be disposed at the cleaner main body 110. As shown, the sensing unit 130 may be disposed at one side of the cleaner main body 110 in which the cleaning unit 120 is located, that is, at a front side of the cleaner main body 110.

The sensing unit 130 may be disposed to overlap the cleaning unit 120 in a vertical direction of the cleaner main body 110. The sensing unit 130 may be disposed at an upper portion than the cleaning unit 120 and may detect an obstacle or a terrain feature at a front side so that the cleaning unit 120 positioned at a forefront of the robot cleaner 100 does not collide with the obstacle.

The sensing unit 130 may perform another sensing function other than the above detecting, perceiving, or sensing function. As an example, the sensing unit 130 may include a camera (not shown) for acquiring a surrounding image. The camera may include a lens and an image sensor. In addition, the camera may convert the surrounding image at a periphery of the cleaner main body 110 into an electrical signal that can be processed by the controller 1800, and for example, may transmit the electrical signal corresponding to an upper image to the controller 1800. The controller 1800 may use the electrical signal corresponding to the upper image to detect a position of the cleaner main body 110.

The sensing unit 130 may include an image acquisition unit. The image acquisition unit may include a three-dimensional (3D) depth camera that acquires a surrounding image and a perspective distance between the main body and an obstacle. The 3D depth camera will be described later.

In addition, the sensing unit 130 may detect an obstacle such as a wall, furniture, and a cliff on a driving surface or a driving path of the robot cleaner 100. In addition, the sensing unit 130 may detect an existence of a docking device that charges a battery. In addition, the sensing unit 130 may detect ceiling information and perform mapping on a driving area or a cleaning area of the robot cleaner 100.

A dust container 140 for separating and collecting a dust in the inhaled air may be detachably coupled to the cleaner main body 110. In addition, the dust container 140 is provided with a dust container cover 150 covering the dust container 140. In one embodiment, the dust container cover 150 may be hinged-coupled to the cleaner main body 110 to be rotated. The dust container cover 150 may be fixed to the dust container 140 or the cleaner main body 110 to maintain a state of covering an upper surface of the dust container 140. When the dust container cover 150 is disposed to cover the upper surface of the dust container 140, the dust container 140 may be prevented from being separated from the cleaner main body 110 by the dust container cover 150.

A portion of the dust container 140 may be accommodated in the dust-container accommodation portion, while the other portion of the dust container 140 may protrude toward a rear direction (that is, a reverse direction R opposite to the forward direction F) of the cleaner main body 110.

The dust container 140 may provide with an inlet through which air containing a dust flows and an outlet through which air separated from the dust is discharged. When the dust container 140 is mounted on the cleaner main body 110, the inlet and the outlet may communicate with each other through an opening 155 formed at an inner wall of the cleaning main body 110. Accordingly, an intake flow path and an exhaust flow path are positioned inside the cleaner main body 110.

According to the above connection, air containing a dust introduced through the cleaning unit 120 passes through the intake flow pass inside the cleaner main body 110 and flows into the dust container 140, and the air and the dust are separated from each other through passing a filter or a cyclone of the dust container 140. The dust is collected in the dust container 140. The air is discharged from the dust container 140, passes through the exhaust flow path inside the cleaner main body 110, and then, is finally discharged to an outside through an exhaust outlet.

The robot cleaner 100 may include a connection terminal (a corresponding terminal) 190 for charging a battery when the robot cleaner 100 is docked to the docking device 200. The connection terminal 190 may be disposed at a position that can be connected to a charging terminal 210 of the docking device 200 in a successful docking state of the robot cleaner 100. In this embodiment, a pair of terminals 190 may be disposed on a bottom surface of the main body 110. Specifically, the connection terminal 190 may be disposed at a position biased forward at a bottom surface of the cleaning unit 120.

Hereinafter, an embodiment related to components (units, members, portions, or elements) of the robot cleaner 100 will be described with reference to FIG. 4.

A robot cleaner 100 or a mobile robot according to an embodiment of the present disclosure may include at least one of a communication unit 1100, an input unit 1200, a driving unit 1300, a sensing unit 1400, an output unit 1500, a power supply unit 1600, a memory 1700, a controller 1800, and a cleaning unit 1900, or a combination thereof.

Specifically, the robot cleaner 100 according to a first embodiment of the present disclosure may include a driving unit (a traveling unit) 1300, an image acquisition unit, and a controller 1800.

Figure 4:
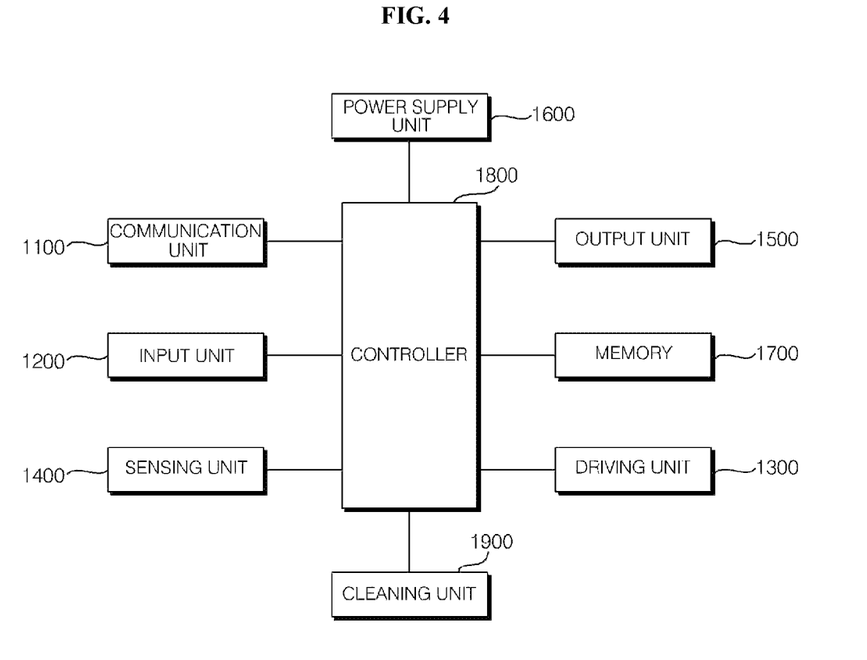
FIG. 4 is a block diagram showing exemplary components of a robot cleaner according to an embodiment of the present disclosure.

In the embodiment, components shown in FIG. 4 are not essential. Accordingly, a robot cleaner may include more or fewer component. Hereinafter, each component will be described. In addition, as described above, the same components of a plurality of robot cleaners described in the present disclosure may be only a part of components among the components described below. That is, a plurality of mobile robots may include different components.

Hereinafter, each component will be described. First, a power supply unit 1600 is provided with a battery that can be charged by an external commercial power to supply power to the mobile robot. The power supply unit 1600 may supply driving power to each of components included in the mobile robot, thereby supplying operation power required for the mobile robot to travel or perform a specific function.

In this instance, the controller 1800 may detect the remaining power of a battery, and control the mobile robot to move to a docking device connected to an external commercial power when the remaining power is insufficient so that the battery is charged by receiving a charging current from the docking device. The battery may be connected to a battery detection unit so that a battery level and a charge state can be transmitted to the controller 1800. The output unit 1500 may display the remaining battery amount on a screen by the controller 1800.

In addition, the robot cleaner 100 may output information that a voice command is inexecutable through the output unit 1500 when the robot cleaner 100 cannot operate according to the voice command transmitted from the docking device. In this instance, the information that the voice command is inexecutable may be a sound or a voice that a user can perceive audibly, or an image or a text that the user can visually recognize.

The battery may be located at a lower portion of a center of the mobile robot or may be located on either a left or right side. In the latter case, the mobile robot may further include a counterweight in order to relieve a weight bias by the battery.

The controller 1800 may process information based on artificial intelligence technology. The controller 1800 may include one or more modules that perform at least one of information learning, information reasoning, information perception, and natural language processing.

The controller 1800 may perform at least one of learning, reasoning, and processing of a large amount of information (big data), such as information stored in the robot cleaner, environment information around the robot cleaner, and information stored in an external storage capable of communicating with the robot cleaner, using machine running technology.

In addition, the controller 1800 may predict (or infer) at least one action or operation of the cleaner that is executable using the information learned using the machine learning technology, and may control the robot cleaner to execute the highest feasibility action among the at least one predicted action or operation. A machine learning technology is a technology that collects and learns a large amount of information based on at least one algorithm, and determines and predicts information based on the learned information.

Learning information is an operation of grasping characteristics, rules, and determining criteria of information, quantifying a relationship between information and another information, and predicting new data using the quantified pattern.

The algorithm used at the machine learning technology may be an algorithm based on statistics, for example, a decision tree that uses a tree structure as a prediction model, an artificial neural network that mimics a structure and function of a neural network in a living organism, genetic programming based on biological evolution algorithms, clustering of distributing observed examples into a subset called clusters, and a Monte Carlo method to calculate function values with a probability through randomized random numbers.

As a field of the machine learning technology, a deep learning technology performs at least one of learning, determining, and processing information using a deep neural network (DNN) algorithm. The deep neural network may have a structure that connects a layer and another layer and transfers data between layers. The deep learning technology can learn a large amount of information through a deep neural network using a graphic processing unit (GPU) optimized for parallel computation.

The controller 1800 may use training date stored in an external server or a memory and may be equipped with a learning engine that detects a feature or a characteristic for recognizing a predetermined figure. In this instance, a feature or a characteristic for recognizing a predetermined figure may include a size, a shape, and a shadow of the predetermined figure.

Specifically, when a part of an image obtained through the image acquisition unit provided at the cleaner is input to the learning engine, the learning engine of the controller 1800 may recognize at least one object or living thing included in the input image. More specifically, in case of an object, the controller 1800 may recognize a general obstacle and a mat-typed obstacle among various things recognized as objects through various methods.

In addition, the controller 1800 may analyze the image collected in the cleaning area, and specify at least one of shapes determined as being located on a wall or a ceiling in the collected images as an artificial marker.

As described above, when the learning engine is applied to the driving of the robot cleaner, the controller 1800 may recognize whether an obstacle such as a chair leg, an electric fan, or a certain type of a balcony gap that interferes with the driving of the robot cleaner exists around the robot cleaner or not. Accordingly, an efficiency and a reliability of driving of the robot cleaner can be enhanced.

Meanwhile, the learning engine as described above may be mounted on the controller 1800 or may be mounted on an external server. When the learning engine is mounted on the external server, the controller 1800 may control the communication unit 1100 to transmit at least one image that is an analysis target to the external server.

By inputting the image sent from the robot cleaner to the learning engine, the external server may recognize at least one object or living thing included in the corresponding image. In addition, the external server may transmit information related to a recognition result back to the robot cleaner. In this instance, the information related to the recognition result may include a number of figures included in the image that is the analysis target, and information related to a name of each figure.

On the other hand, the driving unit 1300 may be provided with a motor. By driving the motor, left and right main wheels may be rotated in both directions to rotate or move a main body of the mobile robot. In this instance, the left and right main wheels may move independently. The driving unit 1300 may move the main body of the mobile robot in a forward, backward, left, and right directions, or may move the main body of the mobile through a curved driving, or may rotate the main body in place.

Meanwhile, the input unit 1200 may receive various control commands for the robot cleaner from a user. The input unit 1200 may include one or more buttons. For example, the input unit 1200 may include a confirmation button, a setting button, or the like. The confirmation button is a button for receiving a command for confirming detection information, obstacle information, location information, and map information from a user, and the setting button is a button for receiving a command for setting the information from the user.

In addition, the input unit 1200 may include a input reset button for cancelling the previous user input and receiving an user input again, a delete button for deleting a preset user input, a button for setting or changing an operation mode, a button for receiving a command to return to the docking device, or so on.

In addition, the input unit 1200 may be a hard key, a soft key, a touch pad, or the like, and the input unit 1200 may be installed on an upper portion of the mobile robot. In addition, the input unit 1200 may have a form of a touch screen together with the output unit 1500.

Meanwhile, an output unit 1500 may be installed on an upper portion of the mobile robot. An installation location or an installation type may be variously changed. For example, the output unit 1500 may display a battery state or a driving method on a screen.

Also, the output unit 1500 may output inside status information of the mobile robot detected by the sensing unit 1400, for example, a current status of each component included in the mobile robot. In addition, the output unit 1500 may display external state information, obstacle information, location information, map information, or so on detected by the sensing unit 1400 on a screen.

The output unit 1500 may include any one of a light emitting diode (LED), a liquid crystal display (LCD), a plasma display panel (PDP), and an organic light emitting diode (OLED).

The output unit 1500 may further include a sound output member for aurally outputting an operation process or an operation result of the mobile robot performed by the controller 1800. For example, the output unit 1500 may output a warning sound to an outside according to a warning signal generated by the controller 1800.

In this instance, the sound output member (not shown) may be a member for outputting sound such as a beeper, a speaker, or so on. The output unit 1500 may output audio data, message data, or so on having a predetermined pattern stored in the memory 1700 to an outside through a sound output member.

Accordingly, the mobile robot according to an embodiment of the present disclosure may output environmental information on a driving area on a screen or output sound related to the environmental information on the driving area through the output unit 1500. According to another embodiment, the mobile robot may transmit map information or environmental information to a terminal device through the communication unit 1100 so that the terminal device outputs an image or a sound to be output.

A control program for controlling or driving the mobile robot and data according to the control program may be stored in the memory 1700. In the memory 1700, audio information, image information, obstacle information, location information, map information, or the like may be stored. Also, information related to a driving pattern may be stored in the memory 1700.

The memory 1700 mainly uses a non-volatile memory. In this instance, the non-volatile memory (NVM, NVRAM) is a storage device that can keep stored information even when power is not supplied, for example, read only memory (ROM), flash memory, a magnetic computer storage device (e.g., a hard disk, a diskette drive, a magnetic tape), an optical disk drive, a magnetic random access memory (a magnetic RAM), a phase-change random access memory (PRAM), or the like.

Meanwhile, the sensing unit 1400 may include at least one of an external signal detection sensor, a front detection sensor, a cliff detection sensor, a two-dimension (2D) camera sensor, and a three-dimension (3D) camera sensor.

An external signal detection sensor may detect an external signal of the mobile robot. The external signal detection sensor may be, for example, an infrared ray sensor, an ultra-sonic sensor, a radio frequency (RF) sensor, or so on.

The mobile robot may confirm a location and a direction of a docking device by receiving a guide signal generated by the docking device through using the external signal detection sensor. In this instance, the docking device may transmit the guide signal indicating a direction and a distance so that the mobile robot can return. That is, the mobile robot may return to the docking device by receiving the signal transmitted from the docking device, determining a current location, and setting a movement direction.

On the other hand, front detection sensors may be installed at a front side of the mobile robot, specifically, along an outer circumferential surface of the mobile robot at regular intervals. The front detection sensor may be located on at least one side of the mobile robot to detect an obstacle in a front side. The front detection sensor may detect a figure, particularly, an obstacle, present in a movement direction of the mobile robot and thus transmit detection information to the controller 1800. That is, the front detection sensor may detect a projecting object, and fixtures, furniture, a wall surface, a wall edge, and the like in a house, which exist on a movement path of the mobile robot, and transmit the information to the controller 1800.

The front detection sensor may be, for example, an infrared sensor, an ultrasonic sensor, a radio frequency sensor, a geomagnetic sensor, etc., and the mobile robot may use one type of sensor as the front detection sensor or two or more types of sensors together as required.

As an example, an ultrasonic sensor may be mainly used to detect a long-distance obstacle. The ultrasonic sensor may include a transmitter and a receiver. The controller 1800 may determine whether an obstacle is present or not based on whether ultrasonic wave emitted from the transmitter is reflected by an obstacle or the like and thus is received at the receiver or not. Also, the controller 1800 also may calculate a distance from the obstacle using an ultrasonic emission time and an ultrasonic reception time.

In addition, the controller 1800 may compare ultrasound wave emitted from the transmitter and ultrasound wave received at the receiver to detect information related to a size of an obstacle. For example, as more ultrasonic waves are received at the receiver, the controller 1800 may determine that a size of an obstacle is greater.

In one embodiment, a plurality of (e.g., five (5)) ultrasonic sensors may be installed along the outer circumferential surface on a front side of the mobile robot. In this instance, preferably, transmitters and receivers of the ultrasonic sensors may be alternately installed on the front surface of the mobile robot.

That is, transmitters may be arranged to be spaced apart from a front center of a main body to a left side and a right side, and one or more receivers may be disposed between the transmitters to form a reception area of an ultrasonic signal reflected by an obstacle or the like. With this arrangement, the reception area can be expanded while reducing a number of sensors. A transmission angle of ultrasonic wave may maintain an angle within a range that does not affect different signals to prevent a crosstalk phenomenon. Also, reception sensitivity of the receiver may be set differently.

In addition, the ultrasonic sensor may be installed upward by a predetermined angle so that ultrasonic wave transmitted from the ultrasonic sensor is output upward. In this instance, a blocking member may be further included to prevent the ultrasonic wave from radiating downward.

Meanwhile, as described above, two or more types of sensors may be used together as the front detection sensor. The front detection sensor may use any one type of sensor, such as an infrared sensor, an ultrasonic sensor, or an RF sensor.

As an example, the front detection sensor may include an infrared sensor as another type of sensor besides an ultrasonic sensor. The infrared sensor may be installed on an outer circumstantial surface of the mobile robot together with the ultrasonic sensor. The infrared sensor may also detect an obstacle positioned at a front side or a lateral side and transmit obstacle information to the controller 1800. That is, the infrared sensor may detect a projecting object, and fixtures, furniture, a wall surface, a wall edge, and the like in a house, which exist on a movement path of the mobile robot, and transmit the information to the controller 1800. Therefore, a main body of the mobile robot can move within a specific area without colliding with an obstacle.

On the other hand, a cliff detection sensor may detect an obstacle on a floor supporting the main body of the mobile robot by mainly using various types of optical sensors. That is, the cliff detection sensor may be installed on a bottom surface of the mobile robot facing the floor. Alternatively, the cliff detection sensor may be installed at a different location depending on a type of the mobile robot.

The cliff detection sensor is located on the bottom surface of the mobile robot to detect an obstacle on the floor. The cliff detection sensor may be an ultrasonic sensor, an RF sensor, and a position sensitive detector (PSD), and an infrared sensor equipped with a light emitting portion and a light receiving portion, like an obstacle detection sensor.

As an example, any one of the cliff sensing sensors may be installed at a front side of the mobile robot, and the other two cliff sensing sensors may be installed relatively at a back side of the mobile robot. For example, the cliff detection sensor may be a PSD sensor. The cliff detection may also include a plurality of different types of sensors.

A PSD sensor detects a short-distance and long-distance position of an incident light by one p-n junction using a semiconductor surface resistance. The PSD sensor may include a one-dimensional PSD sensor that detects light in only one axis and a two-dimensional PSD sensor that detects a light position on a plane. The one-dimensional PSD sensor or the two-dimensional PSD sensor may have a pin photodiode structure. The PSD sensor may be a type of infrared sensor. That is, the PSD sensor uses infrared rays, particularly, the PSD sensor may measure a distance by measuring an angle of received infrared rays reflected at an obstacle after the infrared rays transmit. That is, the PSD sensor calculates a distance from an obstacle using a triangulation method.

The PSD sensor may include a light emitting portion that emits infrared rays to an obstacle and a light receiving portion that receives infrared rays reflected at the obstacle and returned to the light receiving portion. The PSD sensor including the light emitting portion and the light receiving portion may be a module type. When an obstacle is detected by using the PSD sensor, a stable measurement value can be obtained regardless of a difference in reflectivity and color of the obstacle.

The cleaning unit 1900 may clean a designated cleaning area according to a control command delivered from the controller 1800. The cleaning unit 1900 may scatter a periphery dust through a brush (not shown) that scatters the dust in the designated cleaning area, and then, drive a suction fan and a suction motor to suck the scattered dust. In addition, the cleaning unit 1900 may mop or wipe the designated cleaning area according to a replacement of components.

In addition, the controller 1800 may detect a cliff and analyze a depth of the cliff by measuring an infrared angle between an emission signal of infrared ray emitted by a cliff detection sensor toward the ground and a received signal reflected at the obstacle.

Meanwhile, the controller 1800 may determine whether the mobile robot can pass a cliff or not considering a ground state of a cliff detected using the cliff detection sensor, and may determine whether to pass the cliff or not according to the determination result. For example, the controller 1800 may determine a presence or an absence of a cliff and a depth of the cliff through the cliff detection sensor, and then, may allow the mobile robot to pass through the cliff only when a reflection signal is detected through the cliff detection sensor. As another example, the controller 1800 may determine a lifting phenomenon of the mobile robot using the cliff detection sensor.

Meanwhile, a two-dimensional camera sensor may be provided at one surface of the mobile robot to obtain image information related to a periphery of the main body during movement. An optical flow sensor may generate image data having a predetermined format by converting a downward image input from an image sensor provided in the sensor. The generated image data may be stored in the memory 1700.

Also, one or more light sources may be installed adjacent to the optical flow sensor. At least one light source irradiates light to a predetermined area of or a ground (a floor) photographed by an image sensor. That is, when the mobile robot moves a specific area along the ground, if the ground is flat, a certain distance is maintained between the image sensor and the ground.

On the other hand, when the mobile robot moves the ground of the non-uniform surface, a distance between the image sensor and the ground is more than the certain distance due to irregularities and obstacles on the ground. In this instance, one or more light sources may be controlled by the controller 1800 to adjust an amount of light to be irradiated. The light source may be a light emitting device capable of adjusting an amount of light, for example, a light emitting diode (LED).

Using the optical flow sensor, the controller 1800 may detects a location of the mobile robot regardless of sliding of the mobile robot. The controller 1800 may compare and analyze image data photographed by the optical flow sensor over time to calculate a moving distance and a movement direction, and, based on this, calculate a location of the mobile robot. By using the image information on the lower side of the mobile robot using the optical flow sensor, the controller 1800 may correct the location of the mobile robot stably with respect to sliding, rather than a location of the mobile robot calculated by other means.

The 3D camera sensor may be attached to a surface or a portion of the main body of the mobile robot and generate 3D coordinate information related to a periphery of the main body. That is, the 3D camera sensor may be a 3D depth camera that calculates a perspective distance between a mobile robot and an object or a subject to be photographed.

Specifically, the 3D camera sensor may photograph a 2D image related to a periphery of the main body and generate a plurality of 3D coordinate information corresponding to the 2D image.

In one embodiment, the 3D camera sensor has a stereo vision type. That is, the 3D camera may include two or more cameras for obtaining an existing 2D image and combine 2 or more images obtained from the 2 or more cameras to generate 3D coordinate information.

Specifically, the 3D camera sensor according to the embodiment may include a first pattern irradiation portion, a second pattern irradiation portion, and an image acquisition portion. The first pattern irradiation portion may irradiate light of a first pattern downward toward a front side of the main body. The second pattern irradiation portion may irradiate light of a second pattern upward toward the front side of the main body. The image acquisition portion may acquire an image of the front side of the main body. Accordingly, the image acquisition portion may acquire an image of a region in which the light of the first pattern and the light of the second pattern are incident.

In another embodiment, a 3D camera sensor may include an infrared-pattern emitting portion that irradiates an infrared pattern, with a single camera. The 3D camera sensor may capture a shape in which an infrared pattern irradiated from the infrared-pattern emitting portion is irradiated onto an object or a subject to be photographed. Thereby, a distance between the 3D camera sensor and the object or the subject to be photographed can be measured. The 3D camera sensor may be a 3D camera sensor of an infrared (IR) type.

In another embodiment, a 3D camera sensor may include a light emitting portion that emits light, together with a single camera. The 3D camera sensor may receive a part of a laser reflected at an object or a subject to be photographed among a laser emitted from the light emitting portion and analyze the received laser. Thereby, a distance between the 3D camera sensor and the object or the subject to be photographed can be measured. The 3D camera sensor may have a time of flight (TOF) type.

Specifically, the laser of the 3D camera sensor as described above may irradiate a laser extending in at least one direction. In one example, the 3D camera sensor may include first and second lasers, the first laser may irradiate linear lasers intersecting each other, and the second laser may irradiate a single linear laser. According to this, the lowermost laser is used to detect an obstacle at a bottom portion, the uppermost laser is used to detect an obstacle at an upper portion, and an intermediate laser between the lowermost laser and the uppermost laser is used to detect an obstacle in a middle portion.

The sensing unit 1400 may collect information of an artificial marker for the cleaning area. Specifically, the 2D or 3D camera sensor may collect an image including the information of the artificial marker on the cleaning area.

On the other hand, the communication unit 1100 may be connected to a terminal device and/or other device located in a specific area through one communication method of wired, wireless, satellite communication methods to transmit and receive signals and data. In this specification, a term of 'other device' is used interchangeably with a term of 'a home appliance' or 'the home appliance'.

The communication unit 1100 may transmit and receive data with other device located in a specific area. In this instance, the other device may be any device that can be connected to a network to transmit and receive data. For example, the other device may be a device such as an air conditioning device, a heating device, an air purification device, a light fixture, a television, an automobile, or so on. Further, the other device may be a device that controls a door, a window, a water valve, a gas valve, or the like. Further, the other device may be a sensor that detects temperature, humidity, air pressure, gas, or the like.

Also, the communication unit 1100 may communicate with another mobile robot 100 located within a specific area or a predetermined range.

Although not shown, a plurality of mobile robots may communicate with a terminal or a terminal unit (not shown) through network communication and communicate with each other.

In this instance, the network communication may short-range communication using at least one of wireless communication technologies, such as, a Wireless LAN (WLAN), a Wireless Personal Area Network (WPAN), a Wireless-Fidelity (Wi-Fi), a Wireless Fidelity (Wi-Fi) Direct, a Digital Living Network Alliance (DLNA), a Wireless Broadband (WiBro), a World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (Wireless USB), or so on.

Figure 5:
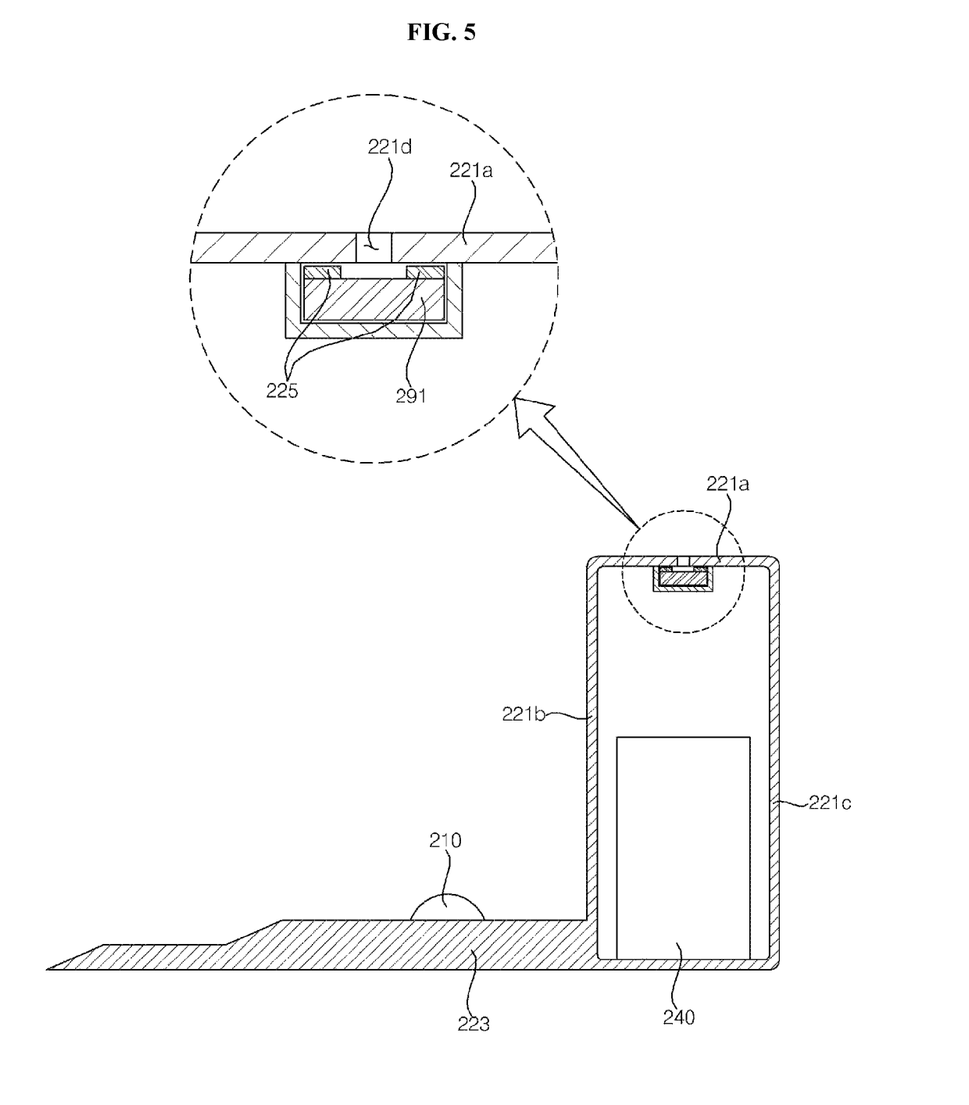
FIG. 5 is a cross-sectional view of a docking device shown in FIG. 1.
Figure 6:
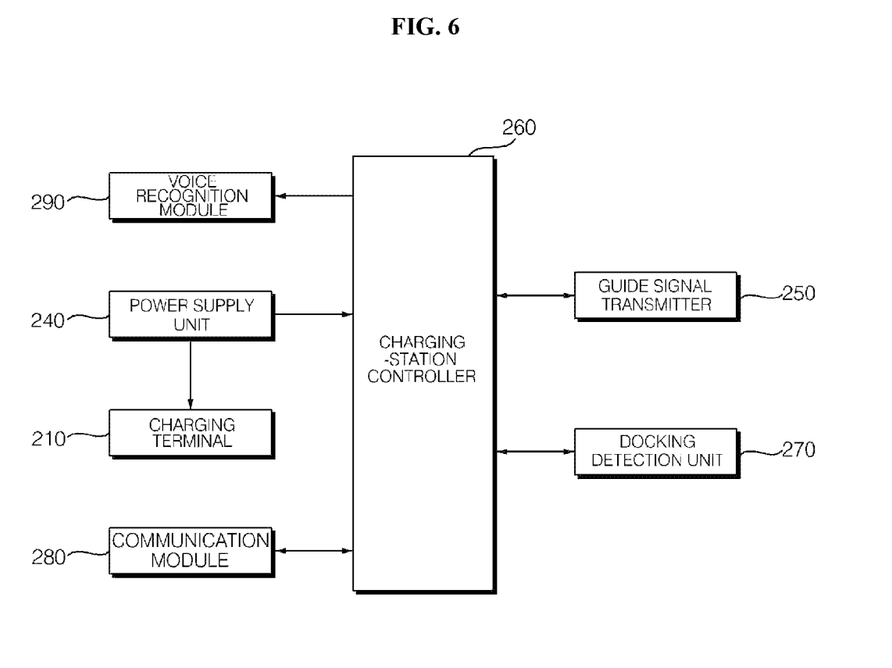
FIG. 6 is a block diagram showing exemplary components of a docking device according to an embodiment of the present disclosure.

Meanwhile, referring to FIG. 1, FIG. 5, and FIG. 6, a docking device 200 may charge a battery that supplies power required to drive the robot cleaner 100. When the robot cleaner 100 detects a remaining battery amount while performing a task and determines that charging is necessary, the robot cleaner 100 may return to the docking device 200 by a charging-stand return algorithm. When the robot cleaner 100 is docked by the charging-station return algorithm, the docking device 200 may supply power to the robot cleaner 100 and the supplied power may charge the battery. When charging is finished, the robot cleaner 100 may leave the docking device 200 and may resume the task that was being previously performed.

The docking device 200 may charge the battery of the mobile robot, may extract a voice command from a voice of a user, may be connected to the mobile robot by a wireless communication method, and may transmit the extracted voice command to the robot cleaner 100.

For example, the docking device 200 may include a docking detection unit 270, a charging terminal 210, a power supply unit 240, a display (not shown), and a guide signal transmitter 250. The docking detection unit 270 may detect whether the robot cleaner 100 is docked or not. The charging terminal 210 is provided for charging the battery of the robot cleaner 100 docked to the docking device 200. The power supply unit 240 may convert commercial alternative-current (AC) power into power for driving the docking device 200 and supply it to the docking device 200. Also, the power supply unit 240 may convert commercial alternative-current (AC) power into commercial direct-current (DC) power used for the battery of the robot cleaner 100 and may supply it to the charging terminal 210. The display may display a charging state of the robot cleaner 100. The guide signal transmitter 250 may transmit a guide signal. Since the above components of the docking device 200 are basic component and are well-known, detailed description thereof will be omitted.

In addition, the docking device 200 may include a communication module 280 for exchanging data with the robot cleaner 100, a voice recognition module 290 for collecting a voice and extracting a voice command from the collected voice, and a charging-stand controller 260 for controlling the communication module to transmit the voice command extracted from the voice recognition module 290 to the mobile robot.

Figure 7:
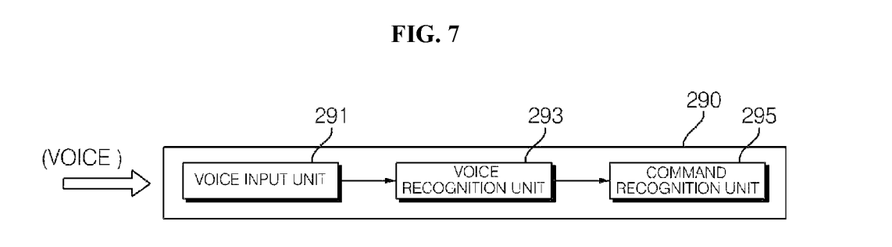
FIG. 7 is a block diagram showing components of a voice recognition module according to an embodiment of the present disclosure.

The voice recognition module 290 may collect a voice of a user and may extract a voice command from the collected voice. For example, the voice recognition module 290 may include a voice input unit 291, a voice recognition unit (a speech recognition unit) 293, and a command recognition unit 295.

The voice input unit 291 may collect a voice given by the user. As an example, the voice input unit 291 may include a microphone.

The voice input unit 291 may extract the collected voice information. In this instance, the voice information may include loudness and accuracy of the voice. The accuracy of the voice is higher as there are fewer other noises when the voice is input, while the accuracy of the voice is lower as there are more other noises when the voice is input.

The voice recognition unit 293 may extract a text from the collected voice. The command recognition unit 295 may determine whether the text where a predetermined distinguishing word related to an operation of each electronic device is used is included or not, using the extracted text. The command recognition unit 295 may include a memory in which information on distinguishing words is stored.

When the collected voice includes a voice (information on a voice) in which a distinguishing word is used, the command recognition unit 295 may extract a voice command from the voice in which the distinguishing word is used.

Although the voice recognition unit 293 and the command recognition unit 295 are separately described to have different functions, but the voice recognition unit 293 and the command recognition unit 295 may be provided in one controller.

The charging-stand controller 260 may control the communication module to transmit the voice command extracted from the voice recognition module 290 to the mobile robot. The charging-stand controller 260 may also perform functions of a voice recognition unit and a command recognition unit.

The charging-stand controller 260 may classify the voice command extracted from the voice recognition module 290 into an executable voice command being executable by the mobile robot and an inexecutable voice command being not executable by the mobile robot. The charging-stand controller 260 may control the communication module to transmit the inexecutable voice command to at least one of a server and an home appliance other than the mobile robot.

In addition, the charging-station controller 260 may control the communication module to transmit the executable voice command to the mobile robot.

When the voice command extracted from the voice recognition module is a voice command executable by the mobile robot and the home appliance other than the mobile robot, the charging-stand controller 260 may control the communication module to transmit the voice command only to the mobile robot.

When the charging-stand controller 260 determines whether the voice command is executable by the mobile robot and the home appliance, a computational burden of the mobile robot and the home appliance for determining whether to perform the voice command transmitted from the docking device 200 can be reduced.

The docking device 200 may include a base 223 on which the charging terminal is disposed, and a charging-station body 221 connected to an end of the base, accommodating the power supply unit, and having a voice inlet hole 221*d* through which the voice flows.

The base 223 may have a plate shape and may form an area in which a part of the robot cleaner 100 can be mounted. That is, when the robot cleaner 100 is being charged, the base 223 may be vertically disposed with a part of the cleaning unit 120 in which the connection terminal 190 is disposed.

The base 223 may be provided with a charging terminal 210. The charging terminal may protrude in an upper direction from the base 223. In this instance, the upper direction may mean a direction perpendicular to a bottom surface of the base 223. When the charging terminal 210 protrudes in the upper direction and thus is exposed to an upper side of the base 223, the charging terminal 210 and the connection terminal may be in close contact by a self-load or a tare weight of the robot cleaner 100.

The charging-station body 221 may have a space for accommodating or receiving the power supply unit 240. The charging-stand body 221 may accommodate or receive the voice recognition module 290, the charging-stand controller 260, and the guide signal transmitter 250.

The charging-station body 221 may be connected to one end of the base 223. More particularly, a lower end of the charging-station body 221 and one end of the base 223 may be connected. The charging-station body 221 may extend in a vertical direction or in an up and down direction. The charging-station body 221 may include an upper surface 221*a* disposed higher than the base 223 and a side surface 221*b* connecting the upper surface 221*a* and the base 223.

The voice inlet hole 221*d* is a space in which voice collected from the microphone flows in. The voice inlet hole 221*d* may connect an inside and an outside of the charging-station body 221. A position of the voice inlet hole 221*d* is not limited. The voice inlet hole 221*d* may be positioned at the upper surface 221*a* in order to smoothly perform the voice recognition by the robot cleaner 100 without limitation and considering a position where a user gives a voice or speaks. The microphone may be placed below the upper surface 221*a*.

The microphone may be accommodated in the charging-station body 221, and an adhesive member 225 may be disposed to surround the voice inlet hole 221*d* and may adhere or attach the upper surface 221*a* and the microphone. The adhesive member 225 may have a ring shape surrounding the voice inlet hole 221*d*.

When the adhesive member 225 is sealed between an upper surface of the microphone and the upper surface 221*a*, a foreign material, such as an external dust, can be prevented from flowing into an inside of the charging-station body 221.

In order to prevent a noise when a voice is collected and to collect an accurate voice, two microphones may be disposed to be spaced apart from each other. A separation distance between the microphones is not limited, but may be 5 cm to 15 cm. In this instance, a plurality of voice collection holes may be provided to correspond to a plurality of microphones.

Meanwhile, the docking device 200 may be connected to the robot cleaner 100 and an electronic device through a wireless communication method.

Figure 8:
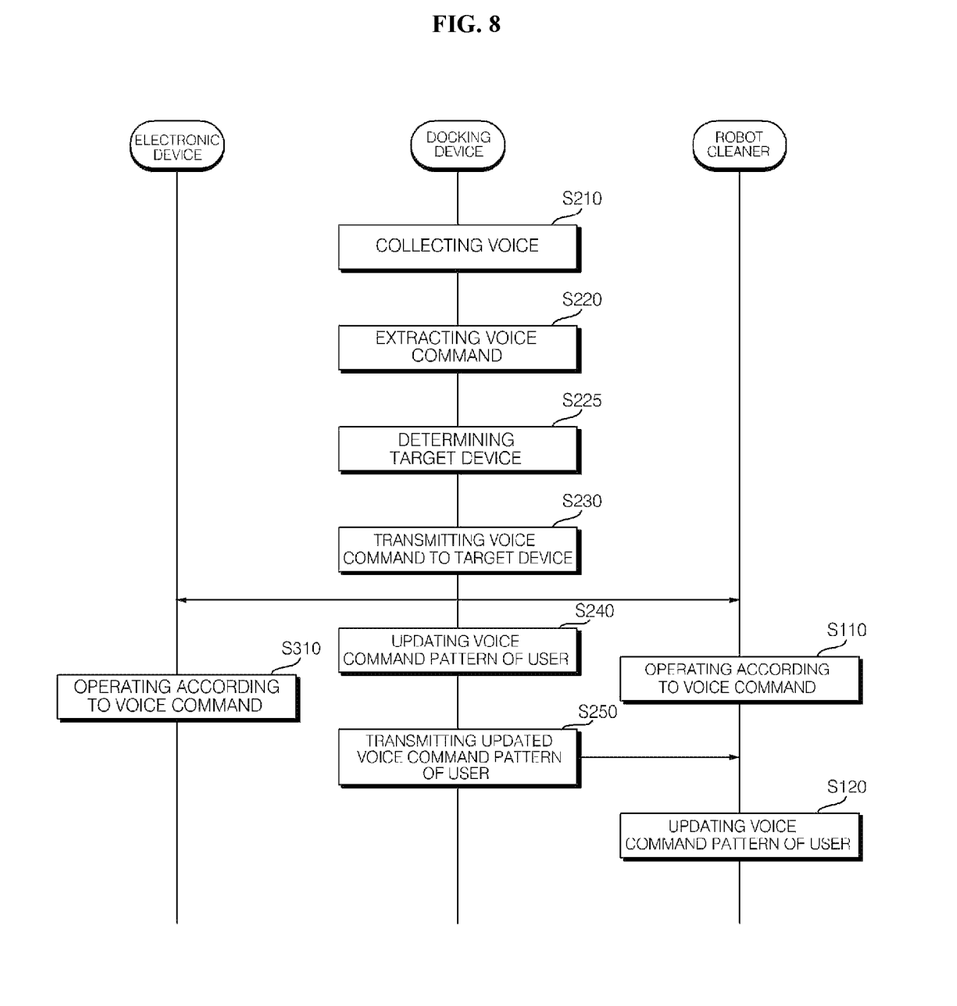
FIG. 8 is a flowchart showing a control method of a mobile robot system according to an embodiment of the present disclosure.

Hereinafter, a method of controlling a robot cleaner according to the present disclosure will be described with reference to FIG. 8. The overlapped contents or steps are denoted by the same reference numeral in a flowchart and overlapping descriptions will be omitted.

A control method may be performed by a controller (not shown) of each electronic device. A control method may be performed by a computer program implementing each step of a control method or may be a recording medium on which a program for implementing a control method is recorded. In the specification, 'recording medium' means a recording medium readable by a computer. A control method according to an embodiment may be performed by a control system of an electronic device including both hardware and software.

Each step and its combination in a flowchart of a control method may be performed by computer program instructions. The instructions may be mounted on a general-purpose computer or a special-purpose computer, etc., and the instructions may create means for performing functions described in a step or steps of a flowchart.

Also, in some embodiments, functions mentioned in steps may occur out of sequence. For example, two steps successively shown may be performed substantially simultaneously or may be performed in a reverse order depending on the corresponding function.

A control method according to an embodiment of the present disclosure may include a step S210 in which a voice is collected by a docking device 200, a step S220 in which a voice command is extracted based on information on the collected voice by the docking device 200, a step S225 in which the docking device 200 determines a target electronic device (a target device) by analyzing the voice command, and a step S230 in which the docking device 200 transmits the voice command to the target electronic device.

In each of the step S210 in which the voice is collected, the docking device 200 may collect a voice of a user. Specifically, a voice recognition module 290 may collect a voice of a user.

In each of the step S220 in which the voice command is extract, the docking device 200 may extract the voice command based on information on the collected voice. A method of extracting the voice command is as described with reference to FIG. 7. Specifically, when the user speaks "please clean" or gives a voice of "please clean", the docking device 200 may extract the voice command by analyzing the voice. As an example, when the docking device 200 recognizes that a distinguishing word of "cleaning" is used, and thus, extracts a voice command of "start cleaning".

In the step S225 in which the target electronic device is determined, the docking device 200 may determine a target electronic device of the voice command by analyzing each voice command. Methods that the docking device 220 determines the target electronic device may be various.

The docking device 200 may determine the target electronic device in consideration of whether an operation according to the voice command is possible or not, accuracy of the voice, and loudness of the voice. In this instance, the target electronic device may mean an electronic device that executes the voice command of the user.

As an example, the docking device 200 may first determine the robot cleaner 100 as the target electronic device.

As another example, when there are a plurality of electronic devices operable according to a voice command, the docking device 200 may determine the robot cleaner 100 among the plurality of electronic devices as the target electronic device.

As still another example, when the robot cleaner 100 is not operable according to a voice command, the docking device 200 May 26, 200 may determine an electronic device operable according to a voice command as the target electronic device.

In the step S230 in which the voice command is transmitted, the docking device 200 may transmit the voice command to the target electronic device. Specifically, a charging-station controller 260 may control a communication module 280 to transmit the voice command of "start cleaning" to the robot cleaner 100.

The electronic device receiving the voice command from the docking device 200 may execute an operation or operate according to the voice command (S110, S130).

The docking device may determine the target electronic device and update a voice command pattern of a user (S240). The docking device 200 may transmit the updated voice command pattern of the user to the plurality of electronic devices connected by a network (S250).

Each of the electronic devices receiving the updated voice command pattern of the user may update its voice command pattern (S120). That is, each of the electronic devices may store updated data of the voice command pattern of the user in its memory.

Although the preferred embodiments of the present disclosure have been illustrated and described above, the present disclosure is not limited to the specific embodiments described above. Also, various modifications can be made by those skilled in the art where the present disclosure belongs without departing from technical features of the present disclosure claimed in the claims, and these modifications should not be individually understood from the technical spirit or prospect of the present disclosure.

The invention claimed is:

1. A docking device, comprising:
   a charging terminal;
   a power supply unit configured to supply power to the charging terminal;
   a communication module configured to exchange data with a mobile robot;
   a voice recognition module configured to collect a voice and extracting a voice command from the collected voice; and
   a charging-station controller configured to control the communication module,
   wherein the charging-station controller is configured to transmit the voice command extracted from the voice recognition module to the mobile robot,
   wherein the charging-station controller classifies the voice command extracted from the voice recognition module into an executable voice command being executable by the mobile robot and an inexecutable voice command being not executable by the mobile robot, and
   wherein the charging-stand controller controls the communication module to transmit the inexecutable voice command to at least one of a server and a home appliance other than the mobile robot.

2. The docking device of claim 1, wherein the voice recognition module comprises:
   a voice input unit configured to collect the voice;
   a voice recognition unit configured to extract a text from the collected voice; and
   a command recognition unit configured to extract the voice command for the mobile robot from the extracted text.

3. The docking device of claim 2, wherein the voice recognition unit includes a microphone.

4. The docking device of claim 3, wherein the microphone includes two microphones spaced apart from each other.

5. The docking device of claim 3, further comprising:
   a base where the charging terminal is disposed;
   a charging-station body being connected to an end of the base, accommodating the power supply unit, and having a voice inlet hole through which the voice flows,
   wherein the microphone is accommodated in the charging-station body.

6. The docking device of claim 5, wherein the charging-station body comprises an upper surface disposed higher than the base and a side surface connecting the upper surface and the base, and
   wherein the voice inlet hole is formed at the upper surface.

7. The docking device of claim 6, further comprising an adhesive member disposed to surround the voice inlet hole and adhering the upper surface and the microphone.

8. The docking device of claim 6, wherein the microphone is disposed lower than the upper surface.

9. The docking device of claim 1, wherein the charging-stand controller controls the communication module to transmit the executable voice command to the mobile robot.

10. The docking device of claim 1, wherein, when the voice command extracted from the voice recognition module is a voice command executable by the mobile robot and the home appliance other than the mobile robot, the charging-stand controller controls the communication module to transmit the voice command only to the mobile robot.

11. The docking device of claim 1, further comprising:
   a docking detection unit configured to detect a docking of the mobile robot; and
   a guide signal transmitter configured to transmit a guide signal for guiding the mobile robot.

12. A mobile robot system, comprising:
   a mobile robot including a main body and a driving unit for moving the main body; and a docking device configured to charge a battery of the mobile robot, extract a voice command from a voice, and being connected to the mobile robot by a wireless communication method, wherein the docking device transmits the extracted voice command to the mobile robot, wherein the mobile robot operates according to the voice command transmitted from the docking device, wherein the docking device classifies the extracted voice command into an executable voice command being executable by the mobile robot and an inexecutable voice command being not executable by the mobile robot, and wherein the docking device controls a communication module to transmit the inexecutable voice command to at least one of a server and a home appliance other than the mobile robot.

13. The mobile robot system of claim 12, wherein the docking device comprises:

a charging terminal;

a power supply unit configured to supply power to the charging terminal;

the communication module configured to exchange data with the mobile robot;

a voice recognition module configured to collect the voice and extracting the voice command from the collected voice; and a charging-station controller configured to control the communication module to transmit the voice command extracted from the voice recognition module to the mobile robot.

14. The mobile robot system of claim 12, wherein the mobile robot further comprises an output unit configured to output information, wherein, when the mobile robot cannot operate according to the voice command transmitted from the docking device, the mobile robot system outputs information that the voice command is inexecutable through the output unit.

* * * * *